United States Patent
Yin et al.

(10) Patent No.: US 9,235,462 B2
(45) Date of Patent: *Jan. 12, 2016

(54) TUNNEL MANAGEMENT METHOD, TUNNEL MANAGEMENT APPARATUS, AND COMMUNICATIONS SYSTEM

(71) Applicant: HUAWEI TECHNOLOGIES CO., LTD., Shenzhen (CN)

(72) Inventors: Yu Yin, Shanghai (CN); Zhiyu Di, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/228,825

(22) Filed: Mar. 28, 2014

(65) Prior Publication Data

US 2014/0211611 A1 Jul. 31, 2014

Related U.S. Application Data

(63) Continuation of application No. 12/982,195, filed on Dec. 30, 2010, now Pat. No. 8,938,640, which is a continuation of application No. PCT/CN2009/072007, filed on May 26, 2009.

(30) Foreign Application Priority Data

Jul. 16, 2008 (CN) .......................... 2008 1 0132421

(51) Int. Cl.
*G06F 11/00* (2006.01)
*G06F 11/07* (2006.01)
(Continued)

(52) U.S. Cl.
CPC ............ *G06F 11/0772* (2013.01); *H04L 12/24* (2013.01); *H04L 12/4633* (2013.01);
(Continued)

(58) Field of Classification Search
CPC ............................ G06F 11/00; H04L 12/4633
USPC ............................................................ 714/4.3
See application file for complete search history.

(56) References Cited

U.S. PATENT DOCUMENTS 7,599,283 B1 * 10/2009 Varier et al. .................. 370/216
7,978,596 B2 * 7/2011 Yamada et al. ............... 370/217
(Continued)

FOREIGN PATENT DOCUMENTS

CN 1627842 6/2005
CN 1627842 A 6/2005
(Continued)

OTHER PUBLICATIONS

Durand, et al.; IPv6 Tunnel Broker; Network Working Group; RFC 3053; http://www.hjp.at/doc/rfc3053.html; Jan. 2001; total 14 pages.
(Continued)

*Primary Examiner* — Amine Riad
(74) *Attorney, Agent, or Firm* — Huawei Technologies Co., LTD.

(57) ABSTRACT

Embodiments of the present invention relate to communications technologies and disclose a tunnel management method, a tunnel management apparatus, and a communications system so that a node that causes failure of a tunnel management request can be determined. According to the present invention, a response returned by a tunnel management node to an initiating node includes not only a cause value of tunnel management request failure but also information of the node that causes failure of the tunnel management request, so that the initiating node can find the node that causes failure of the tunnel management request and determine the error checking direction. The present invention is applicable to network devices in a communications network.

27 Claims, 12 Drawing Sheets

(51) Int. Cl.

| | |
|---|---|
| *H04L 12/24* | (2006.01) |
| *H04L 12/46* | (2006.01) |
| *H04W 76/00* | (2009.01) |
| *H04L 12/26* | (2006.01) |
| *H04W 28/04* | (2009.01) |

(52) U.S. Cl.
CPC ........ *H04L41/0668* (2013.01); *H04L 43/0847* (2013.01); *H04W 76/00* (2013.01); *H04L 2212/00* (2013.01); *H04L 2212/0025* (2013.01); *H04W 28/04* (2013.01)

(56) References Cited

U.S. PATENT DOCUMENTS

| | | | | |
|---|---|---|---|---|
| 8,068,460 | B2* | 11/2011 | Fajardo et al. | 370/331 |
| 8,520,591 | B2 | 8/2013 | Iimori | |
| 2002/0143993 | A1* | 10/2002 | Jung | 709/245 |
| 2003/0117948 | A1 | 6/2003 | Ton et al. | |
| 2004/0064311 | A1 | 4/2004 | Sinha et al. | |
| 2005/0058062 | A1 | 3/2005 | Rudolf et al. | |
| 2005/0201371 | A1* | 9/2005 | Lauer | 370/389 |
| 2006/0087965 | A1* | 4/2006 | Shand et al. | 370/218 |
| 2006/0126584 | A1* | 6/2006 | Zhang et al. | 370/338 |
| 2007/0036073 | A1* | 2/2007 | Yamada | H04L 45/10 370/225 |
| 2007/0121647 | A1* | 5/2007 | Wu | 370/401 |
| 2007/0275710 | A1* | 11/2007 | Mayer et al. | 455/423 |
| 2008/0075045 | A1* | 3/2008 | Prakash et al. | 370/331 |
| 2008/0124074 | A1* | 5/2008 | Yang et al. | 398/10 |
| 2009/0238080 | A1* | 9/2009 | Hirano et al. | 370/241 |
| 2010/0195621 | A1* | 8/2010 | Kekki et al. | 370/332 |

FOREIGN PATENT DOCUMENTS

| | | |
|---|---|---|
| CN | 1835461 A | 9/2006 |
| CN | 1885789 | 12/2006 |
| CN | 1885789 A | 12/2006 |
| CN | 101094152 | 12/2007 |
| CN | 101094152 A | 12/2007 |
| CN | 101631344 | 10/2011 |
| EP | 1879404 | 1/2008 |
| EP | 1879404 A1 | 1/2008 |
| JP | 2005-260972 | 9/2005 |
| JP | 2005260972 A | 9/2005 |
| JP | 2006-121246 | 5/2006 |
| JP | 2006121246 A | 5/2006 |
| JP | 2007-510328 | 4/2007 |
| JP | 2007510328 A | 4/2007 |
| JP | 2007535197 A | 11/2007 |
| WO | 2005-062631 A1 | 7/2005 |
| WO | 2005062631 A1 | 7/2005 |
| WO | 2007103369 A2 | 9/2007 |
| WO | WO 2007/103369 | 9/2007 |

OTHER PUBLICATIONS

Simpson; IP in IP Tunneling; Network Working Group; RFC 1853; tools.ietf.org/html/rfc1853; Oct. 1995; total 9 pages.
3GPP TS 29.274 V1.0.0; 3rd Generation Partnership Project; Technical Specification Group Core Network and Terminals; 3GPP Evolved Packet System; Evolved GPRS Tunnelling Protocol for EPS (GTPv2); Stage 3; (Release 8); May 2008; total 67 pages.
3GPP TS 23.401 V8.2.0; 3rd Generation Partnership Project; Technical Specification Group Services and System Aspects;General Packet Radio Service (GPRS) enhancements for Evolved Universal Terrestrial Radio Access Network; (E-UTRAN) access; (Release 8); Jun. 2008; total 182 pages.
3GPP TS 29.060 V8.4.0; 3rd Generation Partnership Project; Technical Specification Group Core Network and Terminals; General Packet Radio Service (GPRS); GPRS Tunnelling Protocol (GTP); across the Gn and Gp interface; (Release 8); Jun. 2008; total 144 pages.
3GPP TSG CT WG4 Meeting #43; Motorola; OI bit in Cause information element; C4-091116; Sophia-Antipolis; France, Apr. 20-24, 2009; total 4 pages.
3GPP TSG CT WG4 Meeting #42; Motorola, Alcatel-Lucent, Nokia Siemens Networks; IE Type ordering; C4-090798; San Antonio, US, Feb. 9-19, 2009; total 42 pages.
3GPP TSG CT WG4 Meeting #42; Huawei; Cause IE; C4-090263; San Antonio, US, Feb. 9-19, 2009; total 2 pages.
3GPP TSG CT WG4 Meeting #42; Huawei; Cause IE; C4-090262; Agenda item 7.1.2; San Antonio, US, Feb. 9-19, 2009; total 4 pages.
3GPP TS 29.274 V1.1.0; 3rd Generation Partnership Project; Technical Specification Group Core Network and Terminals; 3GPP Evolved Packet System; Evolved GPRS Tunnelling Protocol for EPS (GTPv2); Stage 3; (Release 8); Jul. 2008; total 73 pages.
3GPP TS 24.301 V0.3.0; 3rd Generation Partnership Project; Technical Specification Group Core Network and Terminals; Non-Access-Stratum (NAS) protocol for Evolved Packet System (EPS); Stage 3; (Release 8); May 2008; total 113 pages.
3GPP TS 24.008 V8.1.0; 3rd Generation Partnership Project; Technical Specification Group Core Network and Terminals; Mobile radio interface Layer 3 specification; Core network protocols; Stage 3; (Release 8); Mar. 2008; total 551 pages.
European Office Action dated Feb. 17, 2014 in corresponding European Patent Application No. 12182102.9-1862 (7 pages).
$3^{rd}$ Generation Partnership Project; Technical Specification Group Core Network and Terminals; General Packet Radio Service (GPRS); GPRS Tunnelling Protocol (GTP) across the Gn and Gp interface (Release 8); 3GPP Standard; 3GPP TS 29.060, $3^{rd}$ Generation Partnership Project Sophia-Antipolis Cedex; France, No. V8.4.0, Jun. 1, 2008, pp. 1-145, XP050371101. (pp. 1-144).
$3^{rd}$ Generation Partnership Project; Technical Specification Group Core Network and Terminals; Mobile radio interface Layer 3 specification; Core network protocols; Stage 3 (Release 8), 3GPP TA 24.008 V8.1.0, Mar. 2008, pp. 1-551.
$3^{rd}$ Generation Partnership Project; Technical Specification Group Core Network and Terminals; Non-Access-Stratum (NAS) protocol for Evolved Packet System (EPS); Stage 3 (Release 8), 3GPP TS 24.301 V0.3.0, May 2008, pp. 1-113.
$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS23.401 V8.2.0, Jun. 2008, pp. 1-182.
$3^{rd}$ Generation Partnership Project; Technical Specification Group Core Network and Terminals; 3GPP Evolved Packet System; Evolved GPRS Tunnelling Protocol for EPS (GTPv2); Stage 3 (Release 8), 3GPP TS 29.274 V1.1.0, Jul. 2008, pp. 1-73.
Cause IE, 3GPP TSG CT WG4 Meeting #42, C4-090262, San Antonio, USA, Feb. 9-19, 2009.
Change Request 29.274 CR 0074, v 8.0.0, 3GPP TSG CT WG4 Meeting #42, C4-090263, San Antonio, USA, Feb. 9-19, 2009.
Change Request 29.274 CR 0044, v 8.0.0, 3GPP TSG CT WG4 Meeting #42, C4-090798, San Antonio, USA, Feb. 9-19, 2009.
Change Request 29.274 CR 0130, v 8.1.1, 3GPP TSG CT WG4 Meeting #42, C4-091116, Apr. 20-24, 2009.
Written Opinion of the International Searching Authority, mailed Sep. 3, 2009, in International Application No. PCT/CN2009/072007.
Office Action mailed Mar. 24, 2011, in Chinese Application No. 200810132421.4.
Extended European Search Report, mailed Jul. 13, 2011, in European Application No. 09797378.8.
$3^{rd}$ Generation Partnership Project; Technical Specification Group Core Network and Terminals; 3GPP Evolved Packet System; Evolved GPRS Tunnelling Protocol for EPS (GTPv2); Stage 3 (Release 8), 3GPP TS 29.274, V1.0.0 (May 2008).
$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8), 3GPP TS 23.401 V8.2.0 (Jun. 2008).
International Search Report, mailed Sep. 3, 2009, in corresponding International Application No. PCT/CN2009/072007.

(56) References Cited

OTHER PUBLICATIONS

Search Report issued Oct. 10, 2012 in corresponding Eurpoean Patent Application No. 12182102.9-2416 (12 pages).
Non-Final Office Action mailed May 31, 2013 in co-pending child U.S. Appl. No. 13/729,732 (11 pages).
Final Office Action mailed Nov. 12, 2013 in co-pending child U.S. Appl. No. 13/729,732 (7 pages).
Japanese Office Action issued Mar. 27, 2012 in corresponding Japanese Patent Application No. 2012-517739 (3 pages) (3 pages English Translation).
EP Office Action issued Jan. 13, 2012 in corresponding EP Patent Application No. 09797378.8.
European Search Report dated Jan. 13, 2012 issued in corresponding European Patent Application No. 09797378.8.
Non-Final Office Action dated Aug. 17, 2012 in parent U.S. Appl. No. 12/982,195 (14 pages).
Final Office Action dated Feb. 25, 2013 in parent U.S. Appl. No. 12/982,195 (8 pages).
Non-Final Office Action dated Mar. 21, 2014 in parent U.S. Appl. No. 12/982,195 (5 pages).
Notice of Allowance mailed Nov. 20, 2013 in parent U.S. Appl. No. 12/982,195 (11 pages).
Notice of Allowance mailed Dec. 9, 2013 in co-pending related U.S. Appl. No. 13/729,732 (7 pages).
U.S. Appl. No. 12/982,195, filed Dec. 30, 2010, Yu Yin et al., Huawei Technologies Co., Ltd. Shenzhen, P.R. China.
U.S. Appl. No. 13/729,732, filed Dec. 28, 2012, Yu Yin et al., Huawei Technologies Co., Ltd. Shenzhen, P.R. China.
3GPP TSG CT WG4 Meeting #38, C4-080099, "Analysis on Create Dedicated Bearer Messages for GTP Based S5 Interface Based on GTP Protocol," Huawei, Puerto Vallarta, Mexico, Jan. 28-Feb. 1, 2008, 4 pages.
3GPP TSG CT WG4 Meeting #36bis, C4-071513, "Discussion on S11 Interface," Nokia Siemens Networks, Kobe, Japan, Oct. 8-12, 2007, 5 pages.
3GPP TSG CT WG4 Meeting #39bis, C4-081684, "Pseudo-CR on New Subclause for Non-3GPP Access Related GTPv2 Messages," Nokia Siemens Networks, Zagreb, Croatia, May 23-27, 2008, 3 pages.

\* cited by examiner

TUNNEL MANAGEMENT METHOD, TUNNEL MANAGEMENT APPARATUS, AND COMMUNICATIONS SYSTEM

CROSS-REFERENCE TO RELATED APPLICATIONS

This application is a continuation of U.S. application Ser. No. 12/982,195, filed on Dec. 30, 2010, which is a continuation of International Application No. PCT/CN2009/072007, filed on May 26, 2009, which claims priority to Chinese Patent Application No. 200810132421.4, filed on Jul. 16, 2008. The afore-mentioned patent applications are hereby incorporated by reference in their entireties.

FIELD OF THE INVENTION

Embodiments of the present invention relate to the field of communications network technologies, and in particular, to a tunnel management method, a tunnel management apparatus, and a communications system in a communications network.

BACKGROUND OF THE INVENTION

In an existing packet-switched communications network, a forwarding path must be set up between network nodes to forward service packets. A forwarding path is implemented through a tunnel management procedure, and is created or updated between network elements through a tunnel management request. However, it is possible that the tunnel management request fails for certain reasons. For example, an error occurs in the request message or resources of an associated network node are exhausted. In a prior art, a cause value is generally used to indicate the processing result of the tunnel management request. The cause value indicates whether the processing of the tunnel management request succeeds or fails and indicates the reason of failure when the tunnel management request fails.

In an evolved packet system (EPS), when the mobility management element is a mobility management entity (MME), signaling exchanged between the MME and a packet data network gateway (PDN-GW or P-GW) must cross a serving gateway (S-GW). When a mobile terminal initiates a mobility management or session management procedure that includes a tunnel management request, such as an EPS attach, routing area update, tracking area update, handover, or external PDN connectivity procedure, the MME sends a tunnel management request and the S-GW and PDN-GW cooperate to process the tunnel management request. No matter whether the processing of the tunnel management request is successful or not, the S-GW will send a response which includes a cause value to the MME, indicating the processing result to the MME.

In the tunnel management procedure, however, the inventor finds at least the following problem in the prior art:

If the tunnel management request fails, the node that initiates the tunnel management request receives a response but cannot determine the error of which node has caused the tunnel management request failure according to the response. As a result, the node that initiates the tunnel management request cannot perform processing according to the tunnel management failure caused by different nodes.

SUMMARY OF THE INVENTION

Embodiments of the present invention provide a tunnel management method, a tunnel management apparatus, and a communications system, which enable a node that initiates a tunnel management request to correctly determine the node that has caused the tunnel management request failure and perform processing accordingly.

To achieve the above purposes, the following technical solution is provided:

A tunnel management method includes:
receiving a tunnel management request from an initiating node; and
sending to the initiating node a response message, which includes information of a node that causes failure of the tunnel management request when the tunnel management request fails.

A tunnel management method includes:
sending a tunnel management request to a tunnel management node;
receiving from the tunnel management node a response message, which includes information of a node that causes failure of the tunnel management request when the tunnel management request fails; and
finding the node that causes failure of the tunnel management request according to the node information.

A tunnel management apparatus includes:
a receiving unit, configured to receive a tunnel management request from an initiating node; and
a sending unit, configured to send to the initiating node a response message, which includes information of a node that causes failure of the tunnel management request when the tunnel management request fails.

A tunnel management apparatus includes:
a sending unit, configured to send a tunnel management request to a tunnel management node;
a receiving unit, configured to receive a response message that includes node information from the tunnel management node; and
a searching unit, configured to find a node that causes failure of the tunnel management request according to the node information.

A communications system includes:
an initiating node, configured to send a tunnel management request; and
a tunnel management node, configured to receive the tunnel management request from the initiating node and return a response that includes node information to the initiating node;
where the initiating node is further configured to find a node that causes failure of the tunnel management request according to the node information.

In the embodiments of the present invention, because the response message received by the initiating node includes node information and the initiating node can find the node that causes failure of a tunnel management request according to the node information, even if the tunnel management node further sends the tunnel management request to a remote node, the initiating node is able to distinguish whether the tunnel management request failure is caused by the tunnel management node or the remote node according to the node information. Thus, the initiating node can process the tunnel management request failure more conveniently, more efficiently, and more quickly. The embodiments of the present invention solve the problem in the prior art that an initiating node in a conventional communications system is unable to determine which node has caused the error and therefore fails to perform effective processing.

DETAILED DESCRIPTION OF THE EMBODIMENTS

Figure 1:
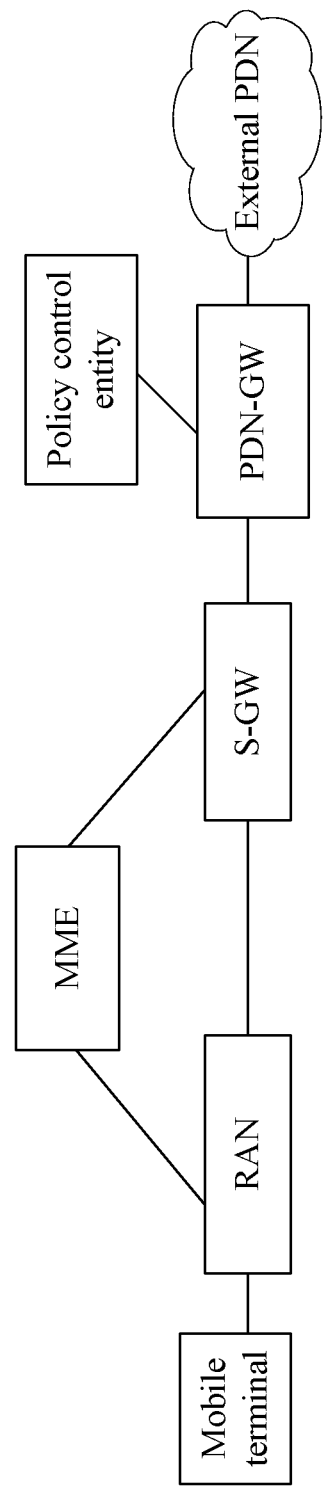
FIG. 1 shows an architecture of an EPS network according to an embodiment of the present invention.

FIG. 1 shows an evolved packet system (EPS) network according to an embodiment of the present invention. The EPS network includes a mobile terminal, a radio access network, a serving gateway (S-GW), a mobility management element, a packet data network gateway (PDN-GW or P-GW), and a policy control entity. When the mobility management element is a mobility management entity (MME), the signaling exchanged between the MME and the PDN-GW must cross the S-GW. If the mobility management element is a serving GPRS support node (SGSN), the SGSN may also send a tunnel management request to the S-GW and cooperate with the S-GW to process a tunnel management request initiated by the PDN-GW.

The embodiments of a tunnel management method, apparatus and system of the present invention will be described in detail with reference to the accompanying drawings.

Embodiment 1

Figure 2:
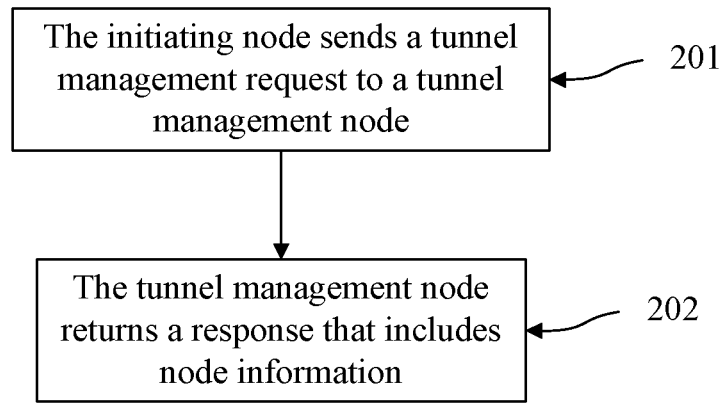
FIG. 2 is a flowchart of a tunnel management method according to a first embodiment of the present invention.

The first embodiment relates to a tunnel management method. As shown in FIG. 2, the method includes the following steps:

201. In a communications system, when it is necessary to manage a user plane forwarding path, an initiating node sends a tunnel management request to a tunnel management node.

202. The tunnel management node receives the tunnel management request from the initiating node and performs appropriate processing, and sends a response that includes a cause value indicating success or failure of the tunnel management request to the initiating node. The response message also includes information of the node that causes failure of the tunnel management request.

Figure 3:
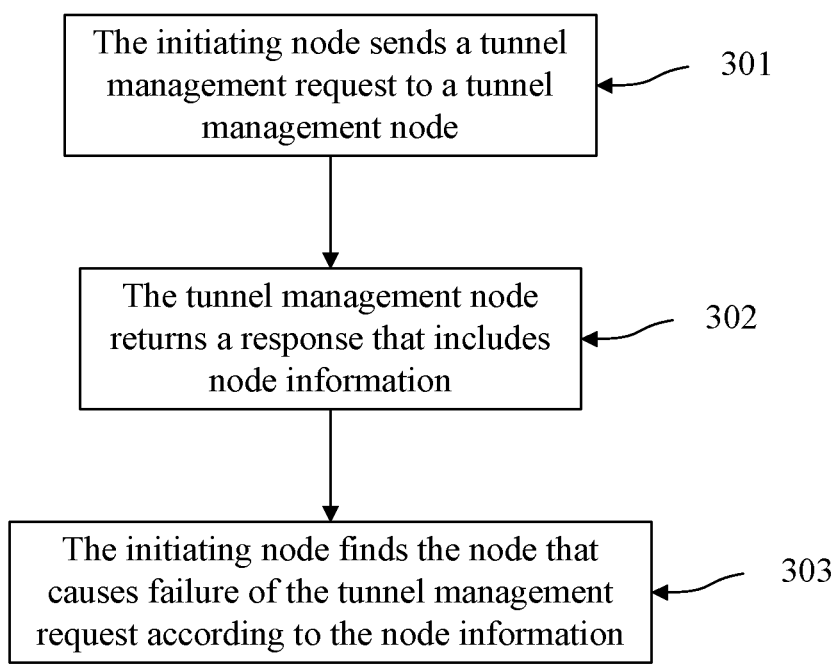
FIG. 3 is a flowchart of another tunnel management method according to the first embodiment of the present invention.

The embodiment provides another tunnel management method. As shown in FIG. 3, the method includes the following steps:

301. In a communications system, when it is necessary to manage a user plane forwarding path, an initiating node sends a tunnel management request to a tunnel management node.

302. The tunnel management node receives the tunnel management request from the initiating node and performs appropriate processing, and sends a response that includes a cause value indicating success or failure of the tunnel management request to the initiating node. The response message returned after processing failure also includes node information.

303. The initiating node finds the node that causes the tunnel management request failure according to the node information. In practice, reasons of failure are varied and therefore different processing is required after the node that causes the tunnel management request failure is located. The subsequent embodiments of the present invention describe the processing with regard to four of the error causes.

Figure 4:
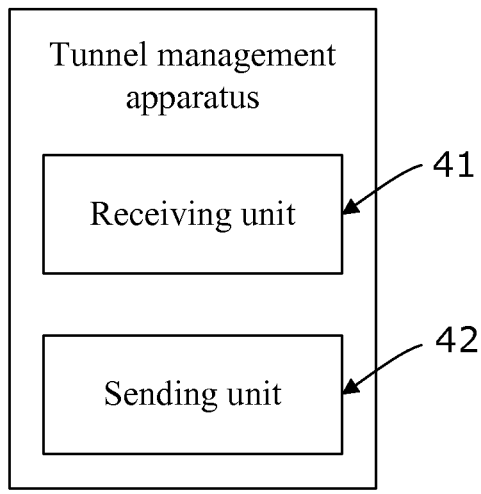
FIG. 4 is a block diagram of a tunnel management apparatus according to the first embodiment of the present invention.

According to the tunnel management method shown in FIG. 2, the embodiment of the present invention provides a tunnel management apparatus. As shown in FIG. 4, the apparatus includes a receiving unit 41 and a sending unit 42.

The receiving unit 41 is configured to receive the tunnel management request from the initiating node. When the processing of the tunnel management request fails, the sending unit 42 is configured to send a response that includes node information to the initiating node. The node information is information of the node that causes the tunnel management request failure so that the initiating node can find the node that causes the tunnel management request failure according to the node information.

Figure 5:
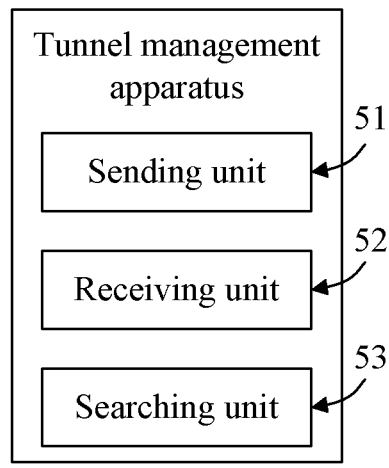
FIG. 5 is a block diagram of another tunnel management apparatus according to n the first embodiment of the present invention.

According to the tunnel management method shown in FIG. 3, the embodiment of the present invention provides a tunnel management apparatus. As shown in FIG. 5, the apparatus includes a sending unit 51, a receiving unit 52, and a searching unit 53.

The sending unit 51 is configured to send a tunnel management request to a tunnel management node, which returns a response that includes node information to the apparatus after processing the tunnel management request. The receiving unit 52 is configured to receive the response that includes node information returned by the tunnel management node. The searching unit 53 is configured to find the node that causes the tunnel management request failure according to the node information.

Figure 6:
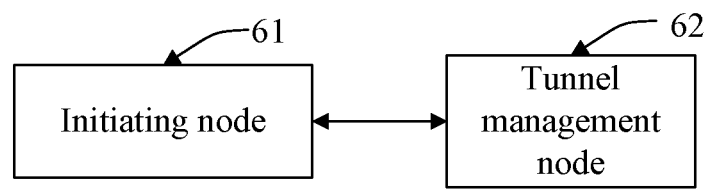
FIG. 6 shows an architecture of a communications system according to the first embodiment of the present invention.

The embodiment also provides a communications system. As shown in FIG. 6, the communications system includes an initiating node 61 and a tunnel management node 62. In the communications system, when it is necessary to manage a user plane forwarding path, the initiating node 61 is configured to send a tunnel management request; the tunnel management node 62 is configured to receive the tunnel management request from the initiating node 61 and return a response that includes node information to the initiating node 61; the initiating node 61 is further configured to find the node that causes the tunnel management request failure according to the node information and perform processing accordingly afterwards, for example, select an effective error check direction or select a new node. Specifically, the error check is: checking whether the error is caused by the local equipment implementation when the error cause included in the received response is an information element (IE) related error with the value such as "IE missing" or "IE decodes error" and checking the equipment implementation of the error node indicated in the response message when the local equipment implementation is correct. This helps the node to locate the error cause quickly and thus assures the correct proceeding of the subsequent procedure.

The embodiment of the present invention determines whether the failure of a tunnel management request is caused by the tunnel management node or a remote node according to the node information so that the initiating node can process the tunnel management request failure more conveniently, more efficiently and more quickly.

Embodiment 2

Figure 7:
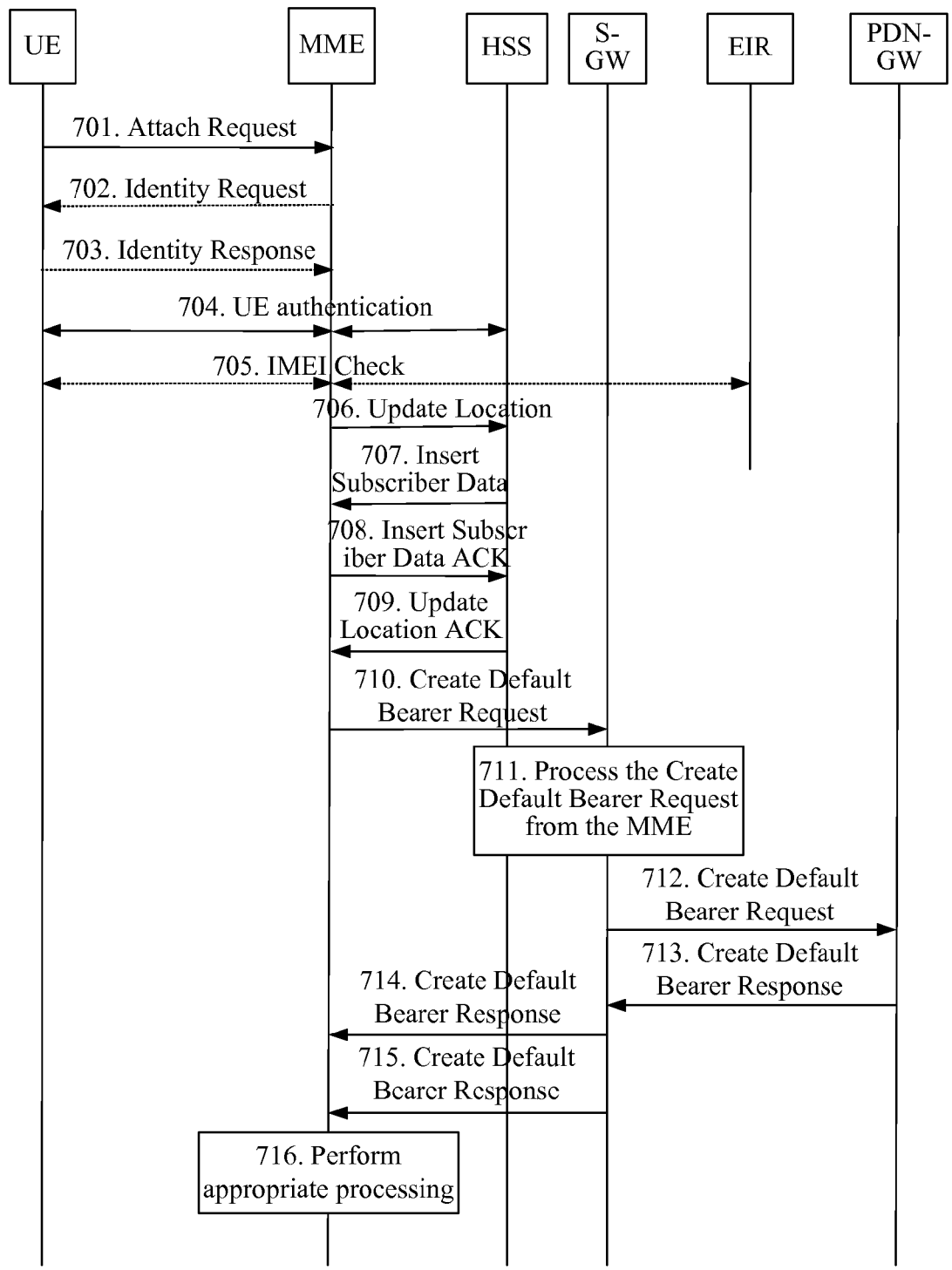
FIG. 7 shows a user attach procedure according to a second embodiment of the present invention.

The application environment of the embodiment is an EPS network. FIG. 7 shows the processing of the network in a attach procedure in EPS network, especially when a tunnel management request fails. The method includes the following steps:

701. A user equipment (UE) sends an Attach Request to the MME.

702. The MME sends an Identity Request to the UE.

703. The UE sends an Identity Response to the MME according to the Identity Request of the MME.

In the embodiment, steps 702 and 703 are optional.

704. The MME and a home subscriber server (HSS) complete authentication of the UE together.

705. The MME and an equipment identity register (EIR) complete the IMEI check of the UE together.

706. The MME sends an Update Location request to the HSS.

707. The HSS sends an Insert Subscriber Data to the MME.

708. The MME returns an Insert Subscriber Data ACK to the HSS.

709. The HSS returns an Update Location ACK to the MME after the MME acknowledges the subscriber data.

710. After the MME receives the location update information, the MME sends a Create Default Bearer Request to the S-GW to create a bearer.

711. As a tunnel management node, the S-GW processes the Create Default Bearer Request sent by the MME. If the S-GW processes the Create Default Bearer Request successfully, steps 712, 713, 714, 716 and subsequent steps are performed; otherwise, step 715 and subsequent steps are performed.

712. The S-GW sends the Create Default Bearer Request to the P-GW.

713. The P-GW processes the Create Default Bearer Request sent from the S-GW and sends a Create Default Bearer Response to the S-GW. The response message includes a cause value indicating whether the processing of the Create Default Bearer Request is successful or unsuccessful, and if unsuccessful, indicating the reason of the processing failure.

714. After the S-GW receives the response from the P-GW, the S-GW returns a Create Default Bearer Response to the MME, indicating whether the processing of the Create Default Bearer Request is successful or unsuccessful with a cause value, and when the response received from the P-GW indicates processing failure, the response returned to the MME includes node information of the P-GW, identifying the node that causes the Create Default Bearer Request failure. The node information may be indicated by a field in the cause of the failure of the tunnel management request, or an IE in the response message.

715. When the S-GW fails to process the Create Default Bearer Request, the S-GW sends a Create Default Bearer Response to the MME, indicating the reason of the Create Default Bearer Request failure with a cause value. The response message includes node information of the S-GW, identifying the node that causes the Create Default Bearer Request failure. The node information may be indicated by a field in the error cause of the tunnel management request, or an IE in the response message.

To enable the MME to obtain more information about the Create Default Bearer Request failure, the response returned in the step may further include additional location information to identify the reason of the Create Default Bearer Request failure.

Figure 8:
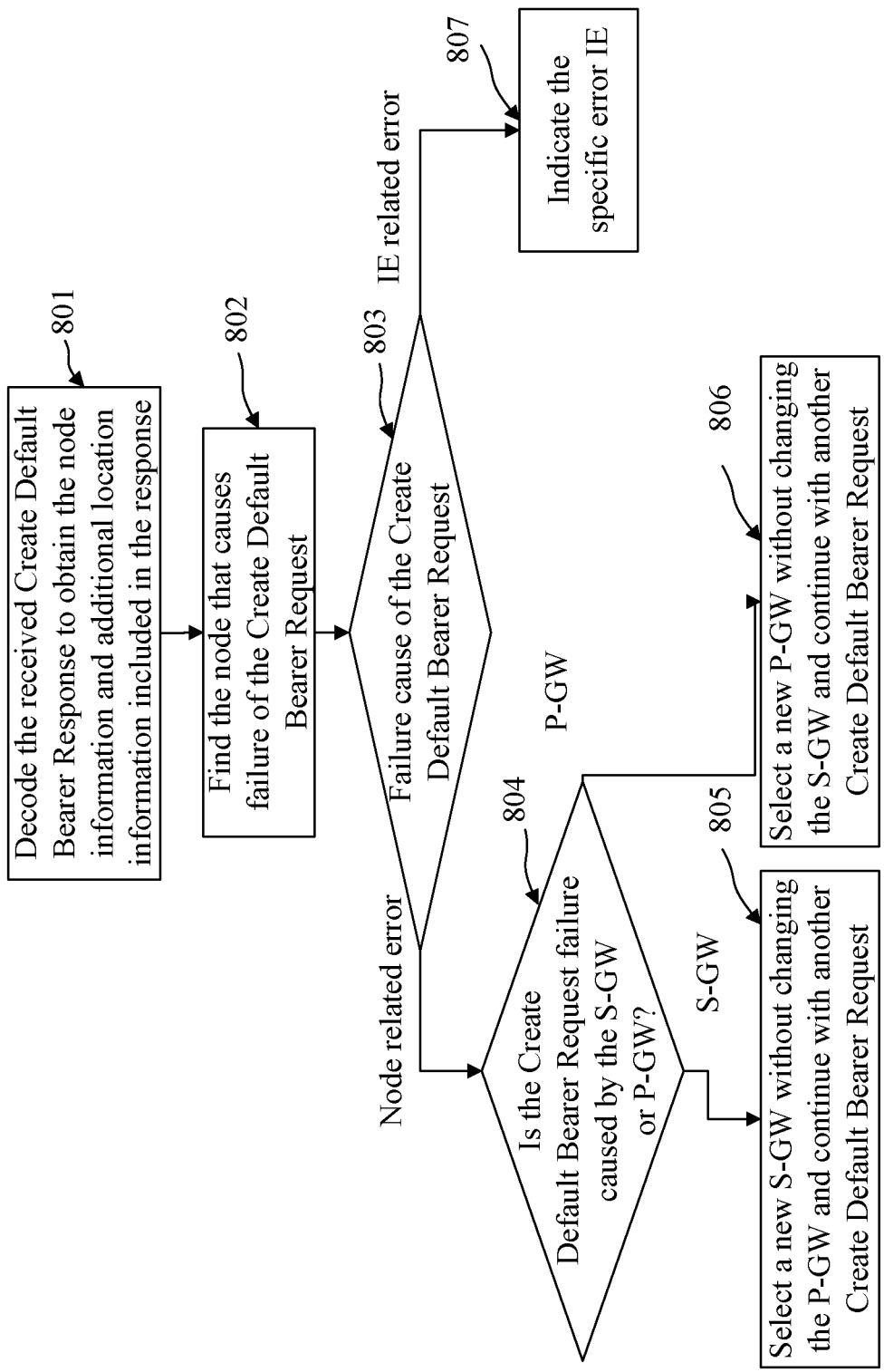
FIG. 8 shows a tunnel management procedure with attach failure according to the second embodiment of the present invention.

716. After the MME receives the Create Default Bearer Response, the MME performs processing according to the node information and additional location information included in the response message. As shown in FIG. 8, the processing of the MME includes the following steps:

801. The MME decodes the received Create Default Bearer Response to obtain the node information and additional location information included in the response.

802. The MME finds the node that causes the Create Default Bearer Request failure according to the obtained node information.

803. The MME analyzes the reason of the Create Default Bearer Request failure according to the cause value. If the reason of the request failure is resource insufficiency or equipment failure, the process proceeds to step 804. The resource insufficiency includes bandwidth insufficiency and memory insufficiency. If the reason of the request failure is IE missing or IE decodes error, for example, an IE in the Create Default Bearer Request is missing or a correct IE is not decoded, step 807 is performed.

804. The MME determines whether the node that causes the Create Default Bearer Request failure is the S-GW or P-GW. If the node is the S-GW, step 805 is performed; if it is the P-GW, step 806 is performed.

805. The MME selects a new S-GW without changing the P-GW and continues with another Create Default Bearer Request.

806. The MME selects a new P-GW without changing the S-GW and continues with another Create Default Bearer Request.

807. The MME locates the missing IE or the incorrectly decoded IE according to the additional location information. An operator may first check whether an error has occurred in the MME, for example, whether IEs in the sent request message are correct. If the IEs are incorrect, the operator can check the MME so that the MME sends the correct Create Default Bearer Request in the next attach procedure. If the IEs are correct, the operator can check whether an error has occurred in the node that causes the Create Default Bearer Request failure.

In practice, because the reasons of the Create Default Bearer Request failure are varied, the MME needs to perform different processing accordingly.

The interface protocol between S-GW and P-GW in the embodiment communicate is the GPRS Tunneling Protocol (GTP). In practice, the S-GW and P-GW may communicate over the Proxy Mobile IP Protocol (PMIP), in which case step 712 and step 713 above are modified as follows:

712'. The S-GW sends a Proxy Binding Update request to the P-GW.

713'. The P-GW processes the Proxy Binding Update request from the S-GW and sends a response to the S-GW if the P-GW fails to process the Proxy Binding Update request. The response is in particular a Proxy Binding ACK, which includes a cause value indicating failure of the processing.

With the node information included in the response returned by the S-GW, the MME can know the node that causes the Create Default Bearer Request failure. When the Create Default Bearer Request fails, the MME can adjust the node that causes the failure in time so that the subsequent procedure is performed correctly.

Embodiment 3

Figure 9:
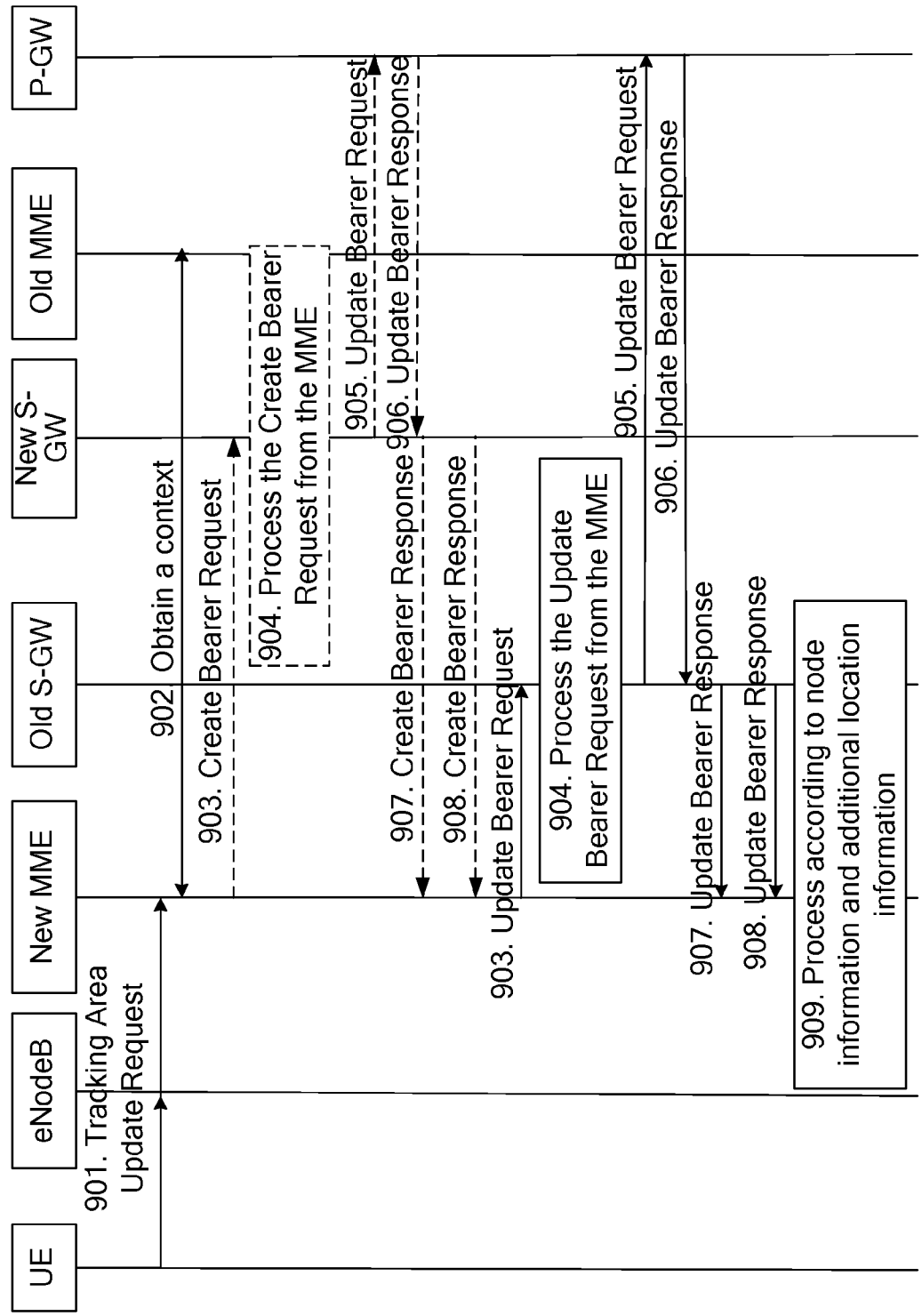
FIG. 9 shows a tracking area update procedure according to a third embodiment of the present invention.

The embodiment is applicable to a tracking area update procedure. As shown in FIG. 9, when a tunnel management request fails, the processing on the network side includes the following steps:

901. A UE sends a Tracking Area Update Request to an evolved NodeB (eNodeB) and the eNodeB sends the Tracking Area Update Request to a new MME.

902. The new MME receives the Tracking Area Update Request and obtains a context from the old MME.

903. The new MME decides whether to select a new S-GW according to the user location information sent from the eNodeB. If the new MME decides not to select a new S-GW, the new MME sends an Update Bearer Request to the old S-GW.

904. As a tunnel management node, the old S-GW processes the Update Bearer Request sent from the new MME. If the old S-GW processes the Update Bearer Request successfully, steps 905, 906, 907, 909 and subsequent steps are performed; otherwise, step 908 and subsequent steps are performed.

905. The old S-GW sends an Update Bearer Request to the P-GW.

906. The P-GW processes the Update Bearer Request from the old S-GW and sends an Update Bearer Response to the old S-GW. The response message includes a cause value indicating whether the processing of the Update Bearer Request is successful or unsuccessful, and if unsuccessful, indicating the reason of the processing failure.

907. The old S-GW receives the Update Bearer Response from the P-GW and sends an Update Bearer Response to the new MME, indicating whether the processing of the Update Bearer Request is successful or unsuccessful with a cause value, and if the cause value included in the Update Bearer Response returned by the P-GW indicates processing failure, the response returned to the new MME includes the node information of the P-GW to identify the node that causes the Update Bearer Request failure. The node information may be indicated by a field in the cause of the failure of the tunnel management request, or an IE in the response message.

To enable the new MME to obtain more information about the Update Bearer Request failure, the response returned in the step may further include additional location information to identify the reason of the Update Bearer Request failure.

908. When the old S-GW fails to process the Update Bearer Request, the old S-GW sends to the new MME an Update Bearer Response, which indicates the reason of the Update Bearer Request failure with a cause value and includes node information of the old S-GW identifying the node that causes the Update Bearer Request failure.

909. The new MME receives the Update Bearer Response and performs processing according to the node information in the response message. For example, the new MME first checks for errors of the local node in the case of an IE related error and then the node causing occurrence of the error checks for errors.

In the embodiment, only the MME is updated in the tracking area update procedure and sometimes the S-GW is also updated. When it is necessary to update the S-GW, the processing is similar to that shown in FIG. 9 and the only difference is that the functions completed by the old S-GW are completed by the new S-GW, as shown by the broken lines.

The step where the new MME obtains a context is the same as steps 901 and 902. After the new MME obtains the context, the new MME decides whether to select a new S-GW. If a new S-GW is selected, the new MME sends a Create Bearer Request to the new S-GW. If the new S-GW processes the Create Bearer Request correctly, the new S-GW sends an Update Bearer Request to the P-GW; otherwise, the new S-GW returns to the new MME a Create Bearer Response, which includes node information of the new S-GW, indicating that the bearer update failure is caused by the new S-GW. After processing the Update Bearer Request, the P-GW returns an Update Bearer Response to the new S-GW. If the P-GW fails to process the Update Bearer Request, the P-GW returns to the new S-GW an Update Bearer Response that includes an error cause. The new S-GW also sends a Create Bearer Response to the new MME. When the response message received from the P-GW indicates processing failure, the response returned to the new MME includes node information of the P-GW, indicating that the bearer update failure is caused by the P-GW.

In practice, procedures like those in the second and third embodiments are adopted in many scenarios such as routing area update and PDN connectivity to implement the failure prompt of tunnel management requests.

Figure 10:
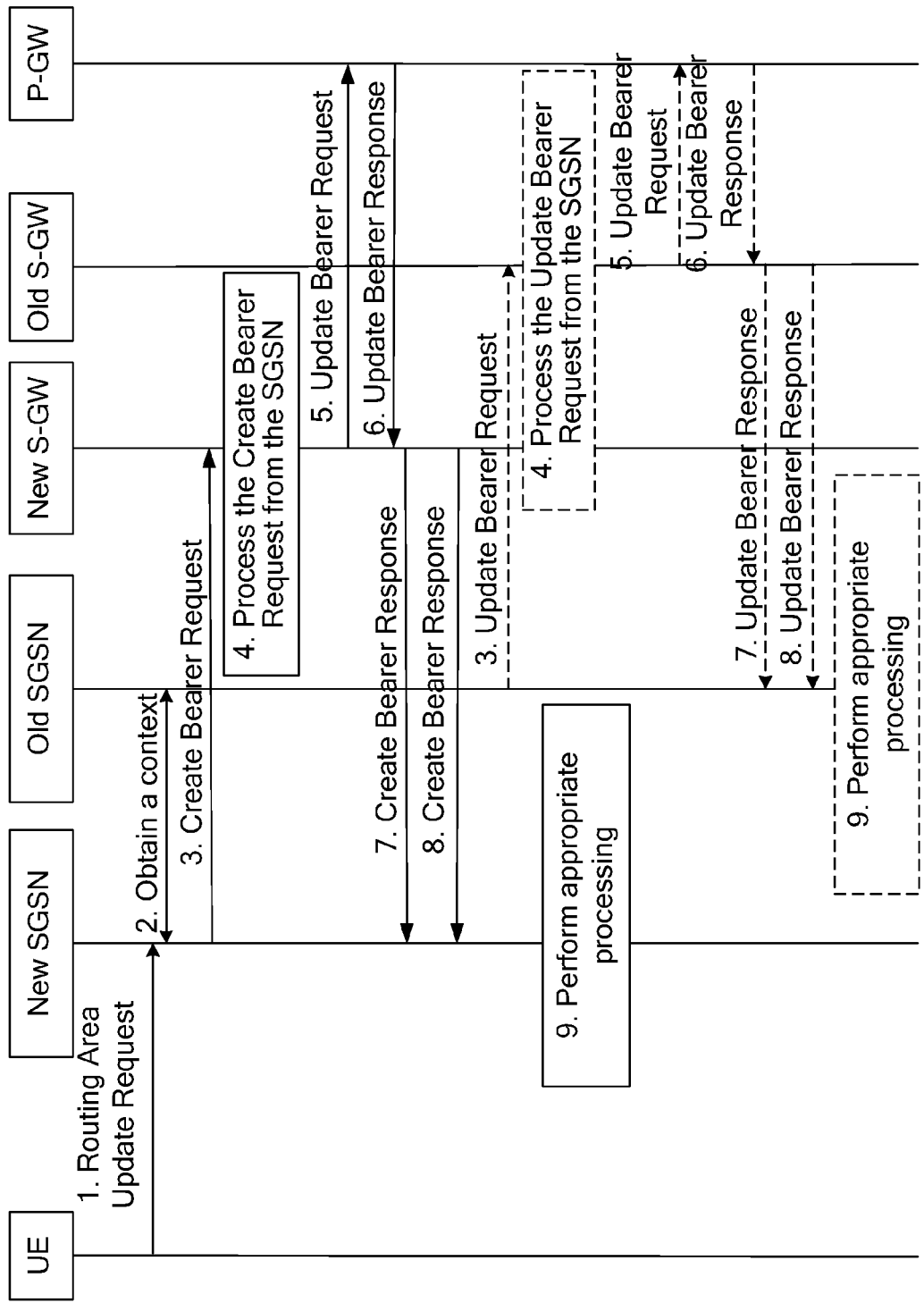
FIG. 10 shows a routing area update procedure according to the third embodiment of the present invention.

In routing area update scenarios, with respect to a routing area update request from a UE, the following two cases may exist:

In the first case, the S-GW changes. In this case, the new SGSN acts as the initiating node of the Create Bearer Request and the new S-GW acts as the tunnel management node of the Create Bearer Request, and the P-GW acts as the remote node. The procedure is shown by the solid lines in FIG. 10.

The UE sends a Routing Area Update Request to the new SGSN. The new SGSN obtains a context from the old SGSN and afterwards sends a Create Bearer Request to the new S-GW. If the new S-GW processes the Create Bearer Request correctly, the new S-GW sends an Update Bearer Request to the P-GW; otherwise, the new S-GW sends to the new SGSN a Create Bearer Response which includes node information of the new S-GW, indicating that the bearer creation failure is caused by the new S-GW. After processing the Update Bearer Request, the P-GW returns to the new S-GW an Update Bearer Response which indicates processing success or failure with a cause value. If the P-GW fails to process the Update Bearer Request, the P-GW returns to the new S-GW an Update Bearer Response that indicates failure. The new S-GW also sends a Create Bearer Response to the new SGSN and when the message returned by the P-GW indicates processing failure, the message returned to the new SGSN includes node information of the P-GW, indicating that the bearer creation failure is caused by the P-GW.

In the second case, the S-GW does not change. In this case, the old SGSN acts as the initiating node of the Routing Area Update Request, the old S-GW acts as the tunnel management node of the Routing Area Update Request, and the P-GW acts as the remote node. The procedure is shown by the broken lines in FIG. 10.

The UE sends a Routing Area Update Request to the old SGSN. The old SGSN sends an Update Bearer Request to the old S-GW. If the old S-GW processes the Update Bearer Request correctly, the old S-GW sends an Update Bearer Request to the P-GW; otherwise, the old S-GW returns to the old SGSN an Update Bearer Response, which includes node information of the old S-GW, indicating that the bearer update failure is caused by the old S-GW. After processing the Update Bearer Request, the P-GW returns to the old S-GW an Update Bearer Response which indicates processing success or failure with a cause value. If the P-GW fails to process the Update Bearer Request, the P-GW returns to the old S-GW an Update Bearer Response that indicates failure. The old S-GW also sends an Update Bearer Response to the old SGSN and when the message returned by the P-GW indicates processing failure, the message returned to the old SGSN includes node information of the P-GW, indicating that the bearer update failure is caused by the P-GW.

From the above description, it is known that the method in the embodiment can indicate the node that causes failure of tracking area update or routing area update in a tracking area update or routing area update procedure so that the node causing the tracking area update or routing area update failure is adjusted in time and that the subsequent procedure proceeds correctly.

Embodiment 4

Figure 11:
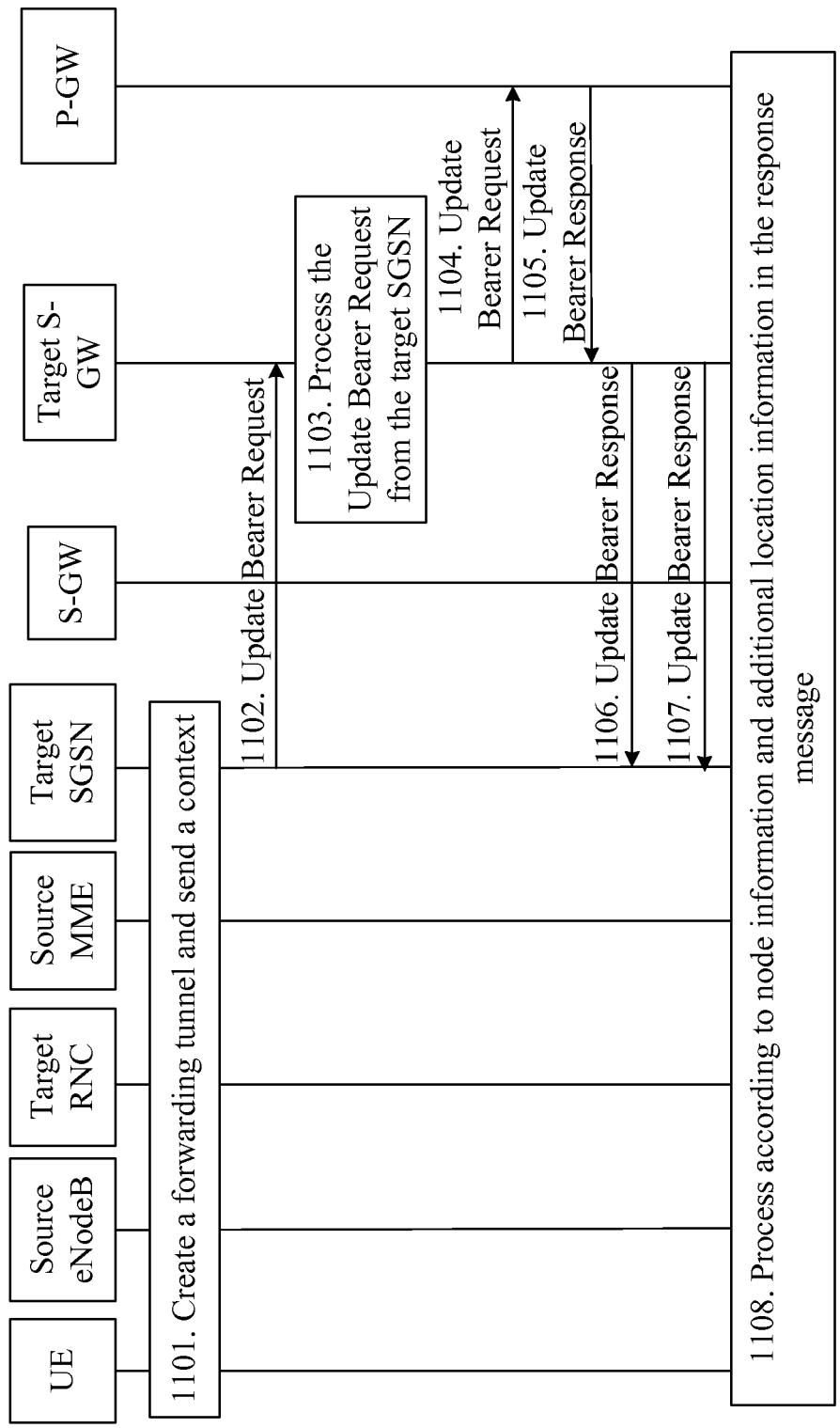
FIG. 11 shows a handover procedure in a radio access network according to a fourth embodiment of the present invention.

The scenario of the fourth embodiment is the handover from an evolved UMTS territorial radio access network (E-UTRAN) to a UMTS territorial radio access network (UTRAN). As shown in FIG. 11, when a tunnel management request fails, the processing of the network includes the following steps:

1101. A UE creates a forwarding tunnel for downlink service packets with the target SGSN of a radio access network and sends the serving radio network subsystem (SRNS) context to the target SGSN.

1102. The target SGSN receives the SRNS context and sends an Update Bearer Request to the target S-GW.

1103. As a tunnel management node, the target S-GW processes the Update Bearer Request sent from the target SGSN. If the target S-GW processes the Update Bearer Request successfully, steps 1104, 1105, 1107 and subsequent steps are performed; otherwise, steps 1106 and 1108 are performed.

1104. The target S-GW sends an Update Bearer Request to the P-GW.

1105. The P-GW processes the Update Bearer Request sent from the target SGSN and returns to the target S-GW an Update Bearer Response, which includes a cause value indicating processing success or failure. When the P-GW fails to process the Update Bearer Request, the P-GW returns to the target S-GW an Update Bearer Response that includes an error cause and node information of the P-GW.

1106. When the target S-GW fails to process the Update Bearer Request, the target S-GW sends to the target SGSN an Update Bearer Response, which indicates the reason of the Update Bearer Request failure with a cause value and includes node information of the target S-GW identifying the node that causes the Update Bearer Request failure.

1107. The target S-GW receives the response from the P-GW and sends to the target SGSN an Update Bearer Response, which includes a cause value indicating whether the processing of the Update Bearer Request is successful or unsuccessful. If the cause value included in the response received from the P-GW indicates processing failure, the target S-GW sends the node information in the response from the P-GW transparently to the target SGSN. The node information may be indicated by a field in the cause of the failure of the tunnel management request or an IE in the response message.

To enable the target SGSN to obtain more information about the Update Bearer Request failure, the response returned in the step may further include additional location information to identify the specific reason of the Update Bearer Request failure.

1108. After the target SGSN receives the Update Bearer Response, the target SGSN performs processing according to the node information and additional location information included in the response message. In the case of an IE related error, the target SGSN first checks for errors in the local node. After it is determined that the processing of the SGSN is correct, the node that causes occurrence of the error checks for errors so that the next procedure can proceed correctly. In the case of resource insufficiency, if the node information indicates an error of the target S-GW, the target SGSN may select a new S-GW and initiate a tunnel management procedure.

From the above description, it is known that the method in the embodiment of the present invention indicates whether the node that causes a bearer update failure is the target S-GW or P-GW during the handover from an E-UTRAN to a UTRAN, so that the target SGSN can adjust the node causing the bearer update failure in time and that the subsequent procedure will proceed correctly.

Embodiment 5

Figure 12:
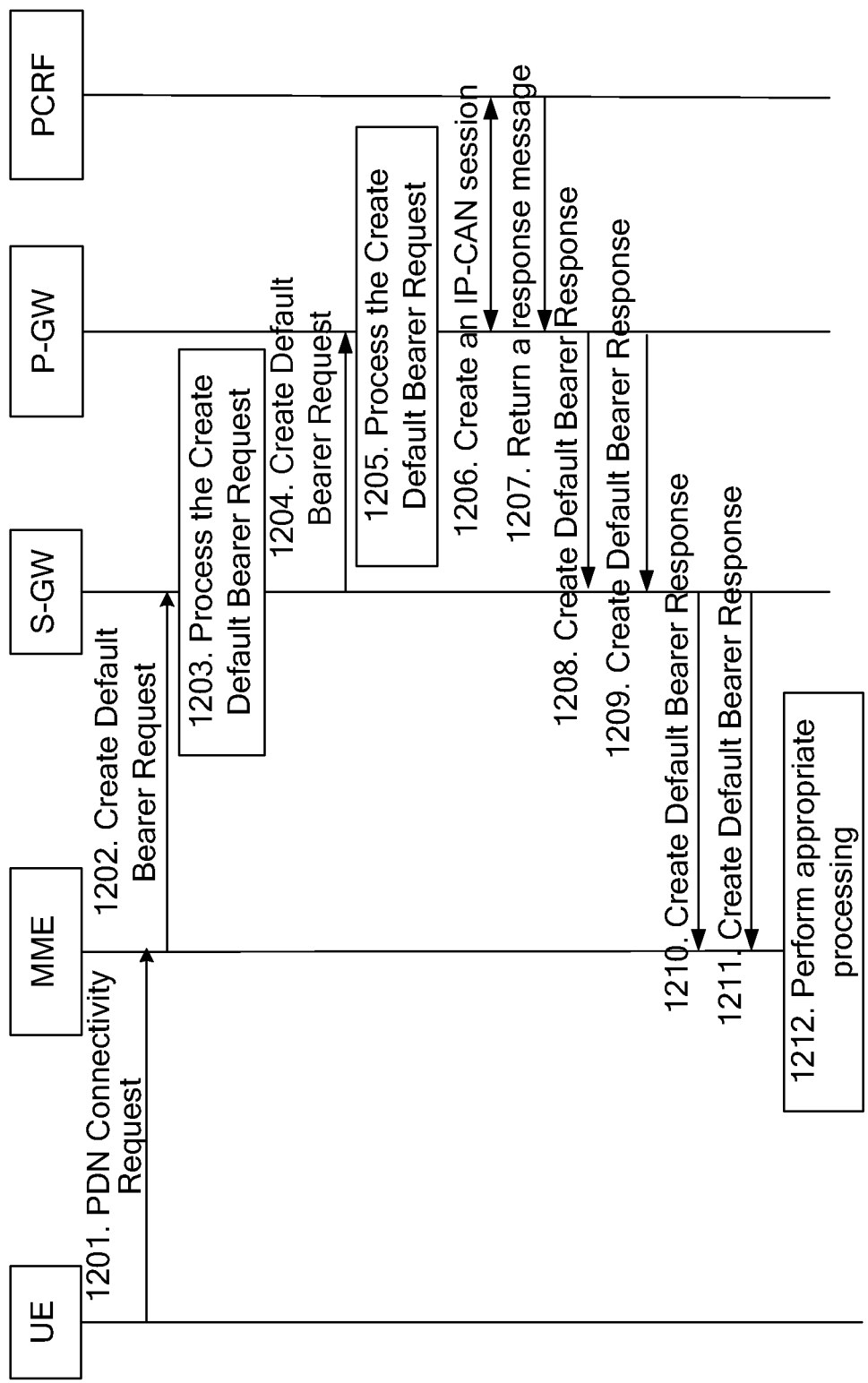
FIG. 12 shows a PDN connectivity procedure according to a fifth embodiment of the present invention.

The scenario of the fifth embodiment is a PDN connectivity procedure. As shown in FIG. 12, when the procedure fails, the method includes the following steps:

1201. A UE sends a PDN Connectivity Request to the MME.

1202. The MME receives the PDN Connectivity Request and sends a Create Default Bearer Request to the S-GW to create a bearer.

1203. As a tunnel management node, the S-GW processes the Create Default Bearer Request. If the S-GW processes the Create Default Bearer Request successfully, step 1204 to steps 1210 and 1212 are performed; otherwise, steps 1211 and 1212 are performed.

1204. The S-GW sends the Create Default Bearer Request to the P-GW.

1205. As a tunnel management node, the P-GW processes the Create Default Bearer Request. If the P-GW processes the Create Default Bearer Request successfully, step 1206 to steps 1208, 1210 and 1212 are performed; otherwise, steps 1209, 1210 and 1212 are performed.

1206. The P-GW creates an IP Connectivity Access Network (IP-CAN) session with a Policy and Charging Rules Function (PCRF).

1207. The PCRF sends to the P-GW a response message which includes a cause value indicating whether the IP-CAN session is created successfully or unsuccessfully.

1208. The P-GW receives the response from the PCRF and returns to the S-GW a Create Default Bearer Response, which includes a cause value indicating whether the processing of the Create Default Bearer Request succeeds or fails. When the cause value in the response received from the PCRF indicates processing failure, the response returned to the S-GW includes node information of the PCRF, identifying the node that causes the Create Default Bearer Request failure.

1209. The P-GW sends to the S-GW a Create Default Bearer Response, which includes a cause value indicating that the Create Default Bearer Request fails and node information of the P-GW, identifying the node that causes the Create Default Bearer Request failure.

The node information may be indicated by a field in the cause of failure of the tunnel management request, or an IE in the response message.

To enable the S-GW to obtain more information about the Create Default Bearer Request failure, the response returned in steps 1208 and 1209 may further include additional location information to identify the reason of the Create Default Bearer Request failure. The additional location information may be indicated by a field in the cause of the failure of the tunnel management request, or an IE in the response message.

1210. The S-GW sends to the MME a Create Default Bearer Response, which includes a cause value indicating that the Create Default Bearer Request fails and node information, identifying the node that causes the Create Default Bearer Request failure. The node information is that included in the response received from the P-GW.

The node information may be indicated by a field in the cause of the failure of the tunnel management request, or an IE in the response message. To enable the MME to obtain more information about the Create Default Bearer Request failure, the response returned in the step may further include additional location information to identify the specific reason of the Create Default Bearer Request failure. The additional location information may be the additional location information included in the response received by the S-GW. The additional location information may also be indicated by a field in the cause of the failure of the tunnel management request, or an IE in the response message.

1211. The S-GW sends to the MME a Create Default Bearer Response, which includes a cause value indicating that the Create Default Bearer Request fails and node information of the S-GW, identifying the node that causes the Create Default Bearer Request failure.

1212. After the MME receives the Create Default Bearer Response, the MME performs processing according to the node information and additional location information included in the response message. In the case of an IE related error, the MME first checks for errors in the local node. After it is determined that the processing of the local node is correct, the node that causes occurrence of the error checks for errors so that the next procedure can proceed correctly. In the case of resource insufficiency, if the node information indicates an error of the P-GW, the MME may select a new P-GW and initiate a new tunnel management procedure. The specific error cause can be known from the additional location information, for example, which IE is lost and which IE is decoded incorrectly.

From the above description, it is known that in the PDN connectivity procedure, the method in the embodiment of the present invention can indicate whether the node causing the PDN connectivity failure is the S-GW, P-GW, or PCRF, so that the MME can adjust the node causing the PDN connectivity failure and that the subsequent procedure can proceed correctly.

Embodiment 6

Figure 13:
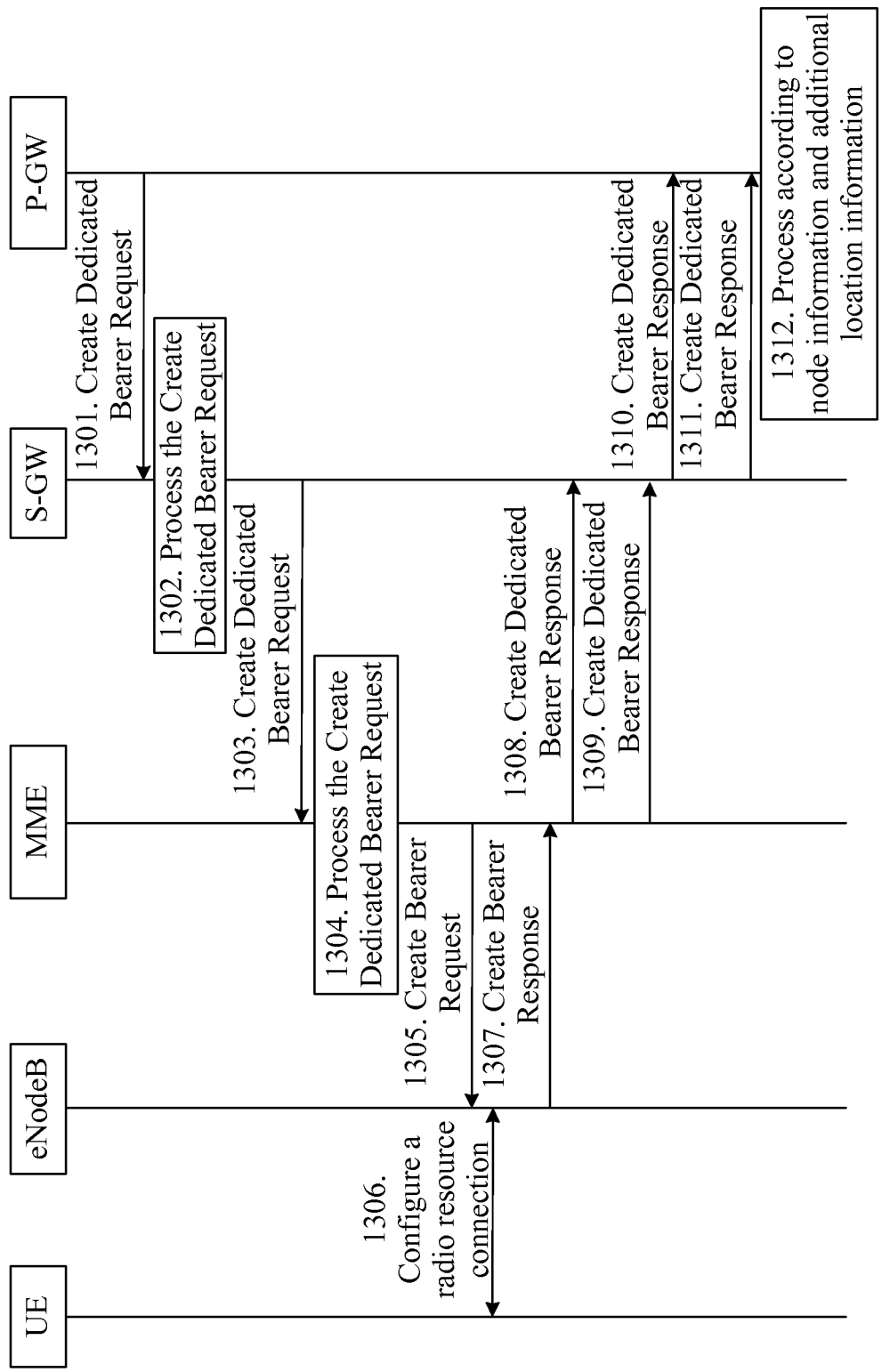
FIG. 13 shows a P-GW initiated bearer update procedure according to a sixth embodiment of the present invention.

The scenario of the sixth embodiment is the bearer creation initiated by the P-GW. As shown in FIG. 13, the method for indicating the bearer creation failure includes the following steps:

1301. The P-GW sends a Create Dedicated Bearer Request to the S-GW.

1302. As a tunnel management node, the S-GW processes the Create Dedicated Bearer Request. If the S-GW processes the Create Dedicated Bearer Request successfully, step 1303 to step 1310 and step 1312 are performed; otherwise, steps 1311 and 1312 are performed.

1303. The S-GW sends the Create Dedicated Bearer Request to the MME.

1304. After the MME receives the Create Dedicated Bearer Request, the MME processes the Create Dedicated Bearer Request. If the MME processes the Create Dedicated Bearer Request successfully, step 1305 to steps 1308, 1310, and 1312 are performed; otherwise, steps 1309, 1310, and 1312 are performed.

1305. The MME sends a Create Bearer Request to the eNodeB of the UE to create a bearer.

1306. The eNodeB configures a Radio Resource Connection (RRC) with the UE.

1307. The eNodeB returns a Create Bearer Response to the MME. If the RRC configuration fails, or the bearer between the eNodeB and the S-GW fails, the response returned by the eNodeB to the MME includes a failure cause value.

1308. The MME returns to the S-GW a Create Dedicated Bearer Response, which includes a cause value of the dedicated bearer creation failure and node information of the eNodeB, indicating that the dedicated bearer creation failure is caused by the eNodeB. The node information may be indicated by a field in the cause of failure of the bearer creation, or an IE in the response message.

1309. The MME returns to the S-GW a Create Dedicated Bearer Response, which includes a cause value of the dedicated bearer creation failure and node information of the MME, indicating that the dedicated bearer creation failure is caused by the MME. The node information may be indicated by a field in the cause of the failure of the bearer creation, or an IE in the response message.

1310. The S-GW sends to the P-GW a Create Dedicated Bearer Response, which includes a cause value indicating that the Create Dedicated Bearer Request fails and node information, identifying the node that causes the Create Dedicated Bearer Request failure. The node information is included in the response message sending from the MME. The node information may be indicated by a field in the cause of the failure of the Create Dedicated Bearer Request, or an IE in the response message.

1311. The S-GW sends to the P-GW a Create Dedicated Bearer Response, which includes a cause value indicating that the Create Dedicated Bearer Request fails and node information of the S-GW, identifying the node that causes the Create Dedicated Bearer Request failure.

To enable the P-GW to obtain more information about the Create Dedicated Bearer Request failure, the response returned in the step may further include additional location information to identify the reason of the Create Dedicated Bearer Request failure. The additional location information may also be indicated by a field in the cause of the failure of the tunnel management request, or an IE in the response message.

1312. After the P-GW receives the Create Dedicated Bearer Response, the P-GW performs processing according to the node information and additional location information included in the response message. In the case of an IE related error, the P-GW first checks for errors in the local node. After it is determined that the processing of the local node is correct, the node that causes occurrence of the error checks for errors so that the next procedure can proceed correctly.

From the above description, it is known that in the dedicated bearer creation procedure, the method in the embodiment of the present invention can indicate whether the node causing the dedicated bearer creation failure is the S-GW, MME, or eNodeB, so that the P-GW can adjust the node causing the dedicated bearer creation failure and that the subsequent procedure can proceed correctly.

Embodiment 7

Figure 14:
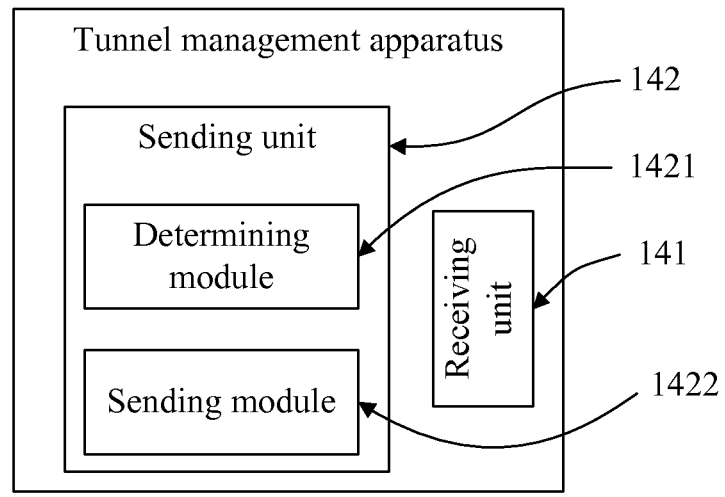
FIG. 14 is a block diagram of a tunnel management apparatus according to a seventh embodiment of the present invention.

According to the second to sixth embodiments, the embodiment of the present invention provides a tunnel management apparatus. As shown in FIG. 14, the apparatus includes a receiving unit 141 and a sending unit 142.

The receiving unit 141 is configured to receive a tunnel management request from an initiating node; when the tunnel management request of the initiating node is processed unsuccessfully, the sending unit 142 is configured to send to the initiating node a response, which includes node information of the node that causes the tunnel management request failure.

The node that causes the tunnel management request failure may be the local node or a remote node. When the node causing the failure is the local node, to assure correct processing of the tunnel management apparatus, the sending unit 142 includes a determining module 1421 and a sending module 1422.

The determining module 1421 is configured to determine whether the local node is able to complete the tunnel management request. The sending module 1422 is configured to send to the initiating node a response message which includes a cause value of failure of the tunnel management request and local node information when the determining module 1421 determines that the local node is unable to complete the tunnel management request, where the local node information is the node information of the node that causes the tunnel management request failure.

When the node causing the tunnel management request failure is a remote node, two cases exist:

In the first case, the node that causes the tunnel management request failure is directly connected to the local node. When the local node processes the tunnel management request correctly, the sending unit 142 is further configured to send the tunnel management request to the remote node. After the remote node processes the tunnel management request, the remote node returns a tunnel management response to the local node. The response message includes a cause value indicating whether the processing is successful or unsuccessful. The receiving unit 141 of the local node is also configured to receive the response from the remote node. When the processing of the remote node is unsuccessful, the response includes a cause value of the tunnel management request failure. Therefore, the response sent by the sending unit 142 to the initiating node includes the cause value of the tunnel management request failure and information of the remote node. This means the response indicates that the remote node information is the node information of the node that causes the tunnel management request failure.

In the second case, the node that causes the tunnel management request failure is a remote node, which is connected to the local node via another remote node. In this case, the sending unit 142 is further configured to send the tunnel management request to the other remote node. The response returned by the other remote node to the local node includes the cause value of the tunnel management request failure and node information which is the information of the remote node. The receiving unit 141 is further configured to receive the response from the other remote node. The response includes the cause value of the tunnel management request failure and node information. The sending unit 142 sends to the initiating node a response that includes the failure cause value and the received node information. This means that the local node transmits the received cause value of the tunnel management request failure and the node information transparently to the initiating node.

To better distinguish the specific reason of the tunnel management request failure, the response received by the receiving unit 141 in the embodiment may also include additional location information, identifying the specific reason of the tunnel management request failure. For example, the additional location information may indicate which IE is missing or incorrectly decoded and which mandatory IE is missing. Likewise, the response sent by the sending unit 142 in the embodiment to the initiating node may also include the additional location information so that the initiating node can find the correct failure cause.

In practice, the tunnel management apparatus in the embodiment of the present invention may be configured in many network devices, such as the S-GW, P-GW, MME, and SGSN.

Figure 15:
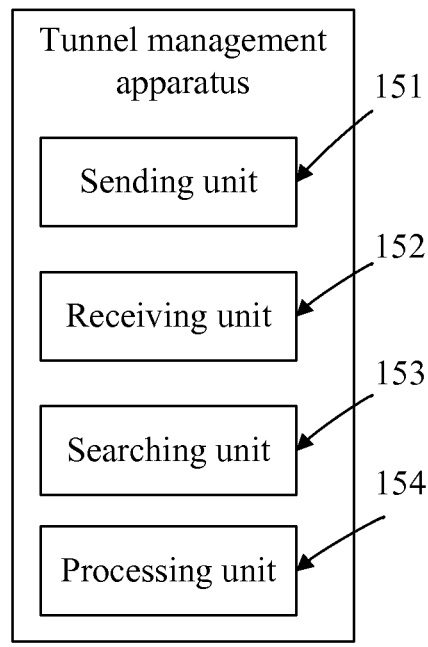
FIG. 15 is a block diagram of another tunnel management apparatus according to the seventh embodiment of the present invention.

According to the tunnel management method shown in FIG. 8 in the second embodiment, the embodiment of the present invention provides another tunnel management apparatus. As shown in FIG. 15, the apparatus includes a sending unit 151, a receiving unit 152, and a searching unit 153.

The sending unit 151 is configured to send a tunnel management request to the tunnel management node. After the tunnel management node processes the tunnel management request, the tunnel management node returns a tunnel management response to the apparatus. If the processing is unsuccessful, the response returned to the apparatus includes node information and additional location information. The node information identifies the node that causes the tunnel management request failure. The additional location information identifies the specific reason of the tunnel management request failure. The receiving unit 152 is configured to receive the response that includes node information returned by the tunnel management node. The searching unit 153 is configured to find the node that causes the tunnel management request failure according to the node information and find the specific reason of the tunnel management request failure according to the additional location information to facilitate the error checking.

To guarantee that the apparatus in the embodiment performs error checking correctly, the tunnel management apparatus further includes a processing unit 154. The processing unit 154 is configured to select a new node to replace the node that causes the tunnel management request failure when the cause of the tunnel management request failure is resource insufficiency or equipment failure; or the processing unit 154 is configured to check for errors of the local node or instruct the node that causes the tunnel management request failure to check for errors when the cause of the tunnel management request failure is IE missing or IE decoded error.

If the network devices are defined as an initiating node, an intermediate node and a remote node, the function of the tunnel management apparatus shown in FIG. 14 to determine whether the local device is able to process the request can be configured on the intermediate node or the remote node; the function of sending or transparently transmitting the error node indication to the initiating node after receiving the response from the remote node can only be implemented on the intermediate node. The tunnel management apparatus shown in FIG. 15 is only configured on the initiating node.

Depending on the specific type of tunnel management request, the initiating node may be an MME, or a P-GW, or an SGSN.

In the embodiment, the response returned by the intermediate node to the initiating node includes node information to enable the initiating node to find the node that causes the tunnel management request failure and make node adjustment accordingly, so that the subsequent procedure proceeds correctly.

Embodiment 8

Figure 16:
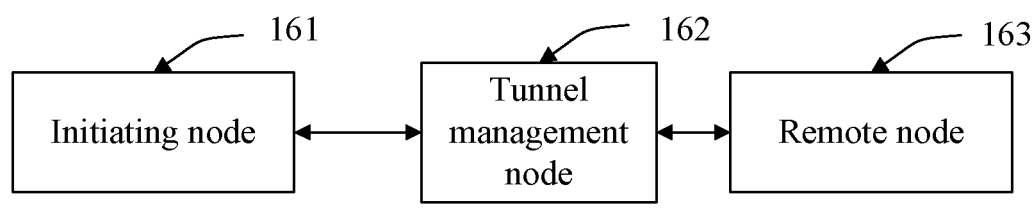
FIG. 16 shows an architecture of a communications system according to an eighth embodiment of the present invention.

The eighth embodiment provides a communications system. As shown in FIG. 16, the communications system includes an initiating node 161 and a tunnel management node 162. When it is necessary to manage a user plane forwarding path, the initiating node 161 is configured to send a tunnel management request to the tunnel management node 162. The tunnel management node 162 is configured to receive the tunnel management request from the initiating node 161 and determine whether the tunnel management node is able to complete the tunnel management request. If the tunnel management node 162 is unable to complete the tunnel management request, the tunnel management node 162 sends to the initiating node 161 a response which includes the cause value of the tunnel management request failure and information of the tunnel management node, indicating that the tunnel management node is the node that causes the tunnel management request failure. The initiating node 161 is further configured to find the node that causes the tunnel management request failure according to the node information in the response returned by the tunnel management node and perform related error checking.

The above communications system generally relates to the communication between two network devices, for example, between MME and S-GW and between S-GW and P-GW.

When a third network device exists in the communications system, the communications system in the embodiment further includes a remote node 163.

When the tunnel management node 162 is able to process the tunnel management request correctly, the tunnel management node 162 sends the tunnel management request to the remote node 163, which causes failure of the tunnel management request due to a certain reason, such as a local node error. The remote node 163 is then configured to return to the tunnel management node 162 a response which includes the cause value of the tunnel management request failure. In this case, the tunnel management node 162 is further configured to send to the initiating node 161 a response that includes the cause value of the tunnel management request failure and information of the remote node, indicating that the remote node is the node causing the tunnel management request failure.

If the remote node is connected to a connection processing device and the tunnel management request from the initiating node needs to be processed by the connection processing device, and if the device that ultimately causes the tunnel management request failure is the connection processing device, the processing of the communications system is as follows:

When the tunnel management node 162 is able to process the tunnel management request, the tunnel management node 162 sends the tunnel management request to the remote node 163. Because the remote node 163 processes the request correctly, the tunnel remote node sends the request to the connection processing device. The connection processing device fails to process the request and returns a failure cause value only to the remote node. Therefore, the response returned by the remote node 163 to the tunnel management node 162 includes the cause value of the tunnel management request failure and node information which is node information of the connection processing device. In this case, the tunnel management node 162 is further configured to send to the initiating node 161 a response that includes the cause value of the tunnel management request failure and the received node information. The received node information matches the node that causes the tunnel management request failure, that is, the connection processing device. In the embodiment, the tunnel management node 162 transmits the cause value of the tunnel management request failure and the received node information transparently to the initiating node.

The embodiment is applicable to a communications system with respect to various possible failure causes during the management of a user plane forwarding path and indicates the cause to the initiating node so that the initiating node performs appropriate processing.

Because the response received by the initiating node includes node information and the initiating node can find the node causing the tunnel management request failure according to the node information, the initiating node will be able to distinguish whether the tunnel management request failure is caused by the tunnel management node or the remote node, even if the tunnel management node further sends the tunnel management request to the remote node. Thus, the initiating node can process the tunnel management request failure more conveniently, more efficiently, and more quickly.

Through the descriptions of the preceding embodiments, those skilled in the art may understand that the present invention may be implemented by hardware only or by software and a necessary universal hardware platform. However, in most cases, using software and a necessary universal hardware platform are preferred. Based on such understandings, all or part of the technical solution under the present invention that makes contributions to the prior art may be essentially embodied in the form of a software product. The software product may be stored in a computer readable storage medium, such as a hard disk, a compact disk read-only memory (CD-ROM), and a floppy disk. The software product includes a number of instructions that enable a computer device (personal computer, server, or network device) to execute the methods provided in the embodiments of the present invention.

Although the invention has been described through some exemplary embodiments, the invention is not limited to such embodiments. It is apparent that those skilled in the art can make various modifications and substitutions to the invention without departing from the spirit and scope of the present invention. Therefore, the protection scope of the present invention is subject to the appended claims.

What is claimed is:

1. A tunnel management method, comprising:
   sending, by an initiating node, a message of a tunnel management request to a tunnel management node;
   receiving, by the initiating node, a response message responsive to the message of the tunnel management request from the tunnel management node, wherein when a failure of the tunnel management request occurs, the response message comprises an indication indicating which node that causes the failure; and
   determining, by the initiating node, a node that causes the failure according to the indication.

2. The method according to claim 1, wherein when the failure is caused by a remote node, the indication indicates that the failure is caused by the remote node.

3. The method according to claim 1, wherein when the failure is caused by the tunnel management node, the indication indicates that the failure is caused by the tunnel management node.

4. The method according to claim 1, wherein the indication is added into the response message by the tunnel management node.

5. The method according to claim 1, wherein the response message further comprises a cause value of the failure.

6. The method according to claim 1, further comprising:
selecting, by the initiating node, a new node to replace the node which causes the failure.

7. A tunnel management apparatus, comprising:
a transmitter configured to send a message of a tunnel management request to a tunnel management node;
a receiver configured to receive a response message responsive to the message of the tunnel management request from the tunnel management node, wherein when a failure of the tunnel management request occurs, the response message comprises an indication indicating which node that causes the failure; and
a processor configured to determine a node that causes the failure according to the indication.

8. The apparatus according to claim 7, wherein when the failure is caused by a remote node, the indication indicates that the failure is caused by the remote node.

9. The apparatus according to claim 7, wherein when the failure is caused by the tunnel management node, the indication indicates that the failure is caused by the tunnel management node.

10. The apparatus according to claim 7, wherein the indication is added into the response message by the tunnel management node.

11. The apparatus according to claim 7, wherein the response message further comprises a cause value of the failure.

12. The apparatus according to claim 7, wherein:
the processor is further configured to select a new node to replace the node which causes the failure.

13. A tunnel management system, comprising:
a tunnel management apparatus according to claim 7; and
a tunnel management node.

14. A communication system, comprising:
a first node; and
a tunnel management node,
wherein:
the first node is configured to send a tunnel management request to the tunnel management node; and
the tunnel management node is configured to send a response message responsive to the tunnel management request to the first node,
wherein the response message includes a fault indication indicating which node of the tunnel management node and a second node caused a fault.

15. The system according to claim 14, wherein the response message further includes a cause value indicating a reason for the fault.

16. The system according to claim 14, wherein the first node is further configured to select a third node to replace the node caused the fault.

17. The system according to claim 14, wherein the tunnel management node is configured to set the fault indication in the response message.

18. The system according to claim 14, wherein the first node is a Mobility Management Entity (MME), and the tunnel management node is a Serving Gateway (S-GW).

19. The system according to claim 14, wherein the first node is a Packet Data Network Gateway (PDN-GW), and the tunnel management node is a Serving Gateway (S-GW).

20. The system according to claim 14, wherein the first node is a Mobility Management Entity (MME), the tunnel management node is a Serving Gateway (S-GW) and the second node is a Packet Data Network Gateway (PDN-GW).

21. The system according to claim 14, wherein the first node is a Packet Data Network Gateway (PDN-GW), the tunnel management node is a Serving Gateway (S-GW) and the second node is a Mobility Management Entity (MME).

22. The system according to claim 14, wherein the fault is a failure of the tunnel management request.

23. The system according to claim 14, wherein the tunnel management request is for creating a default bearer.

24. The system according to claim 23, wherein the fault is a failure of handling the default bearer.

25. The system according to claim 24, wherein the response message further includes a cause value indicating a reason for the fault.

26. The system according to claim 25, wherein the initiating node is a Mobility Management Entity (MME), and the tunnel management node is a Serving Gateway (S-GW).

27. The system according to claim 26, wherein the initiating node is further configured to select a new node to replace the node that caused the fault.

* * * * *